(12) United States Patent
Ho

(10) Patent No.: US 7,429,706 B2
(45) Date of Patent: Sep. 30, 2008

(54) INTERACTIVE IR ELECTRONIC WHITE BOARD

(76) Inventor: Wai Ho, No. 1, Qinzheng Road, Dongsheng Town, Zhongshan City, Guangdong Province 528412 (CN)

( * ) Notice: Subject to any disclaimer, the term of this patent is extended or adjusted under 35 U.S.C. 154(b) by 637 days.

(21) Appl. No.: 10/540,899

(22) PCT Filed: Nov. 17, 2003

(86) PCT No.: PCT/CN03/00973

§ 371 (c)(1),
(2), (4) Date: Jun. 27, 2005

(87) PCT Pub. No.: WO2004/059570

PCT Pub. Date: Jul. 15, 2004

(65) Prior Publication Data

US 2006/0097989 A1    May 11, 2006

(30) Foreign Application Priority Data

Dec. 27, 2002   (CN) .............................. 02 1 49761

(51) Int. Cl.
*G06F 3/042* (2006.01)

(52) U.S. Cl. .................. 178/18.01; 178/18.09; 345/175

(58) Field of Classification Search ......... 345/173–175; 178/18.01, 18.03, 18.09
See application file for complete search history.

(56) References Cited

U.S. PATENT DOCUMENTS

| 4,928,094 A | * | 5/1990 | Smith ......................... 345/175 |
| 6,429,857 B1 | * | 8/2002 | Masters et al. .............. 345/175 |
| 2002/0033805 A1 | * | 3/2002 | Fujioka et al. .............. 345/175 |

* cited by examiner

*Primary Examiner*—Amare Mengistu
*Assistant Examiner*—Robert R Rainey
(74) *Attorney, Agent, or Firm*—Charles E. Baxley

(57) ABSTRACT

The present invention discloses an interactive IR electronic white board, around which is an infrared emitting and receiving array. An output port of a column driver of emitting array is connected to high frequency modulating signal generator, and an output port of a column driver of the receiving array is connected to a microprocessor through a signal receiving circuit and an analog-digital converter A/D. The emitting array and the receiving array are connected to emitting and the receiving driver through emitting and receiving driver lines, and the emitting driver and the receiving driver are connected with the microprocessor through address bus. The present invention utilizes the Inverse Square Law of optical theory and the linear direct ratio relation between the quantity change of light particles received by an infrared receiving diode and the output voltage of the receiving diode to associate the output voltage of the receiving diode with the interrupted width of the infrared light path, so that it can calculate the coordinate of interrupter accurately and improve the resolution of infrared scanning. The present invention can not only distribute pens or erase, but can be used by plurality of users at the same time as well.

5 Claims, 13 Drawing Sheets

INTERACTIVE IR ELECTRONIC WHITE BOARD

TECHNICAL FIELD

This invention relates to an interactive infrared electronic white board

BACKGROUND ART

Existing electronic white boards are interactive or non-interactive: an interactive white board works with a digital projector to display computer display to the white board, making the white board into a super large interactive computer touch screen. A uses can use fingers to click directly on the white board to operate the computer system and at the same time write, draw or modify contents; while the non-interactive white board can not be connected to a computer, in that the content of the white board can only be stored through printing on paper. There are many kinds of interactive white boards: one use electromagnetic conversion technology and its metal pen generate magnetic field with electric current passing through; when moving on the white board, track of the pen can be deduced based on electromagnetic conversion principle, and is converted and recorded as coordinate records; it can provide very precise coordinate. However the cost of materials is relatively high and required special electronic pen, making it not very convenient to use; another one comprises plastic membrane with resistance networks on upper and lower layers; under no pressure, the plastic membrane ensure no short circuit through insulating devices; when writing on the board, upper and lower resistance network short circuit under the pressure, and generate different voltage for different positions on the resistance network, thus defines the position of the moving pen through change of voltage. It does not use special pens, but needs special plastic membrane to capture moving objects. After prolong use, the plastic membrane is subject to scratch, which causes white noise. It is also subject to environment factors such as temperature, humidity, which cause the system become unstable; another one uses supersonic technology, i.e., by adding a special supersonic emitting device on the pen, receivers on left and right top corners of the white board, it calculates the distance between the object and receivers through calculating time difference in emitting and receiving supersonic waves, then use algebra principles to reach the track of the whiting pen. This device needs re-positioning and adjustment before every use and pen must be perpendicular to the writing surface, or errors occur. Special electronic pens not only increase cost, but also make it less convenient; in order to resolve the special requirement for electronic pens and erasers for existing devices, and dependency on special writing surfaces, this invention provides a kind of white board utilizing infrared beams to capture inputs, but because in traditional infrared touch systems or touch screen technologies, there is limitation on physical dimensions of electro-optical devices such as emitting and receiving diodes, if position of moving object is decided by only replying on whether beams of emitting and receiving diodes on identical light axis is block or not, the maximum resolution of applied white board is the dimension of the emitting or receiving diode. Due to its low resolution, this type of technology can apply only to applications requires touching only, but not to hand writing input methods. In order to improve resolution of touch screens, some latest most typical patented technologies were published. U.S. Pat. No. 6,429,857 dated Aug. 6, 2002 publicized a kind of off axis single emitting multiple receiving technology, wherein judgments are based on not only whether a light beam is blocked for emitting and receiving tubs on the same light axis, but also on off axis blocking using adjacent emitting and receiving diodes. Even though this technology can improve resolution for a certain level, dead corners caused by physical distribution density of infrared diodes and complexity of calculation can cause some errors, which in turn cause problems in uniformity of resolution and smoothness in capturing objects. The Chinese patent 00121462.4 dated Feb. 13, 2002 publicized a kind of method and structure to improve performance of infrared touch screens. It uses the lowest point of a hyperbolic model as the coordinate of the blocking object. This invention claims that when an object is blocking, output voltages of several blocked diodes forms a hyperbola, by assuming only when the dimension of the blocking object is similar to that of a finger, and variation of output voltages on receiving diodes of all channels must fit into changing trend of said hyperbola, an effective touching event happens, or a precise coordinate is decided. If the blocking object is a 2-5 mm pen head or an object cannot act like a finger, through which an infrared beam can pass, or the infrared beam fro the emitting diode cannot reach the blocked receiving diode through secondary reflection, said hyperbolic judgment method no longer stands. This shows that it is not enough to just copy the current infrared touch screen capturing technologies to electronic white boards to capture tracks (or characters) of moving objects on white boards.

CONTENT OF THE INVENTION

The purpose of this invention is to provide an interactive infrared electronic white board which does not need special pens or erasing devices and special writing surfaces as capturing mechanism, does not subject to environment factors, is cost effective and with durable surface, low complexity of electronic circuits, and high resolution.

The main technical scheme for this invention is: An interactive infrared electronic white board, wherein an infrared emitting array set horizontally and vertically on its edge and a corresponding infrared receiving array also set horizontally and vertically on its edge, are connected respectively with a microprocessor through a row driver and a column driver; the output port of the column driver of the infrared emitting array is connected with a high frequency modulated signal generator; while the output port of the column driver of the infrared receiving array is connected with the microprocessor through a signal receiving circuit and an analog-digital (A/D) converter, the infrared emitting array is connected with the emitting row driver and column driver through emitting row drive lines and column drive lines respectively; the infrared receiving array is connected with the receiving row driver and column driver through receiving row drive lines and column drive lines respectively; through a row address bus, the emitting row driver and the receiving row driver is connected with the microprocessor, and through a column address bus, the emitting column driver and the receiving column driver is connected with the microprocessor, said microprocessor is connected with an external storage device, and is connected with a computer through a chip via a controlling RS232 serial port or an USB port.

This invention utilizes two completely integrated emitting and receiving arrays; each has its own array circuit driver. Therefore it is easy to layout the circuit board and save driver circuit. Using modular arrays not only simplify and standardize manufacture, but also make it possible to produce electronic white board of different size using different quantity of modules. Furthermore, this invention does not need special pens or erasing devices, and does not rely on special writing surfaces, does not subject to environment factors, is cost effective, and with high surface durability, and can reduce the complexity of electronic circuits of the electronic white board. In order to increase resolution of infrared beam capturing, this invention also by using the inverse square law of the inverse proportion relationship between the density of light particles and the square of the distance to the light axis, establishes the relationship between variation of voltage on the infrared receiving diode when the light path is blocked, and the moving distance of the moving object, thus obtains precise tracking coordinates of the moving objects, greatly increases resolution of infrared beam capturing, and finally realizes an infrared electronic white board with technology using infrared to capture handwriting, and with high resolution capture capabilities.

DESCRIPTION OF THE FIGURES

The present invention will be described in details in combination with the accompanying figures and the concrete embodiments.

EMBODIMENTS

Figure 11:
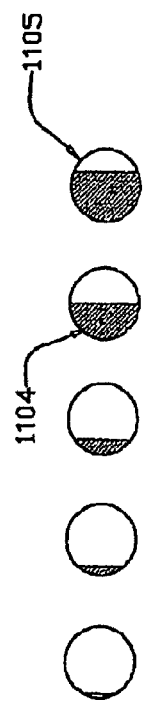
FIG. 11 is the schematic view showing the infrared beam axial tunnel.
Figure 11:
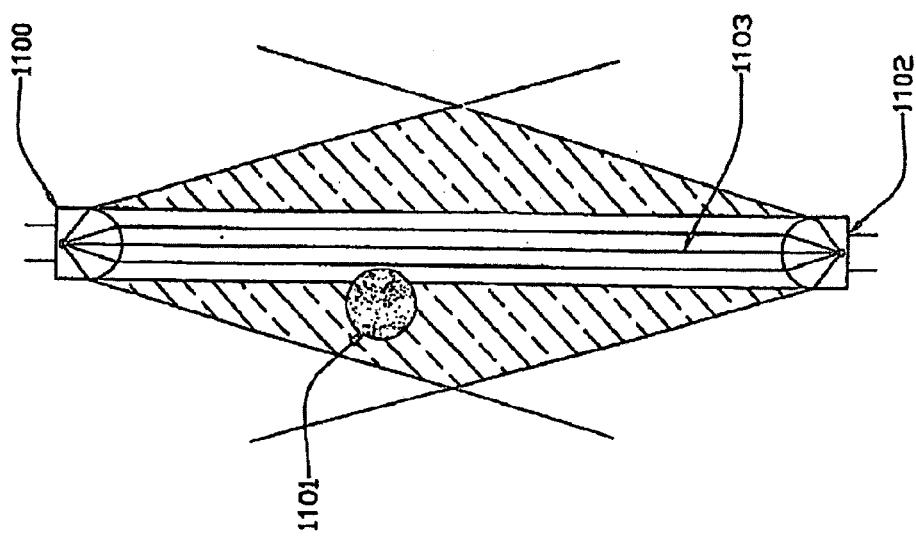

In order to increase resolution of infrared beam scan capturing, this invention establishes a model based on distribution density of light particles on the light path, and by using the relationship between reduction of density of light particles caused by blocking of light path by block objects and variation of output voltages on the receiving diode, establishes a curve equation with a tan(x) function or a quadruple or upper curve equation with the blocking distance as self variable x, and the voltage variation on the receiving diode as the function. The higher the power of the equation, the more precise the results. Normally power of five is enough for satisfactory precision. Of course, under circumstance when high precision if not needed, lineal equation is feasible. By future using this standard equation to calculate concrete blocking positions or widths of blocking objects in the light path, a new method to increase capturing resolution is proposed. By using sequence number of emitting and receiving diodes as coordinates, and at the same time by using output voltages of the capturing receiving diode to judge the blocking distance of the blocking objects in the light path during emitting and receiving, this invention can future fractionize the coordinates of the emitting and receiving diodes, thus provide a very high and precise input resolution. As shown in FIG. 11, its principles are: when the corresponding emitting diode 1100, the receiving diode 1102 are located on the same light axis, and form a cylindraceous light path 1103, the sectional diameter of the tunnel is the same as the diameter of the emitting diode convex lens (assuming the convex lenses are the same for the emitting and receiving diodes). When object 101 moves and pass said light path, part or more of the light beam from the emitting diode is blocked, and the light tunnel gradually disappears with the movement of object 1101, light particles (light beam) pass through the tunnel also graduate reduce with the movement of the object. As we now that lights transmit straightly, number of light particles reaching the receiving diode through diffraction is very few, and can be ignored. According to optical theories, the closer to the center of the light axis, the higher the density of light particles (light beam), so the distribution of light particles (light beam) on the section of light path is not even, and the density of light particles reaching the receiving diode is not evenly distributed. Therefore, the Inverse Square Law needs to be applied to calculate the density of the leftover part after the light tunnel is blocked.

Figure 1:
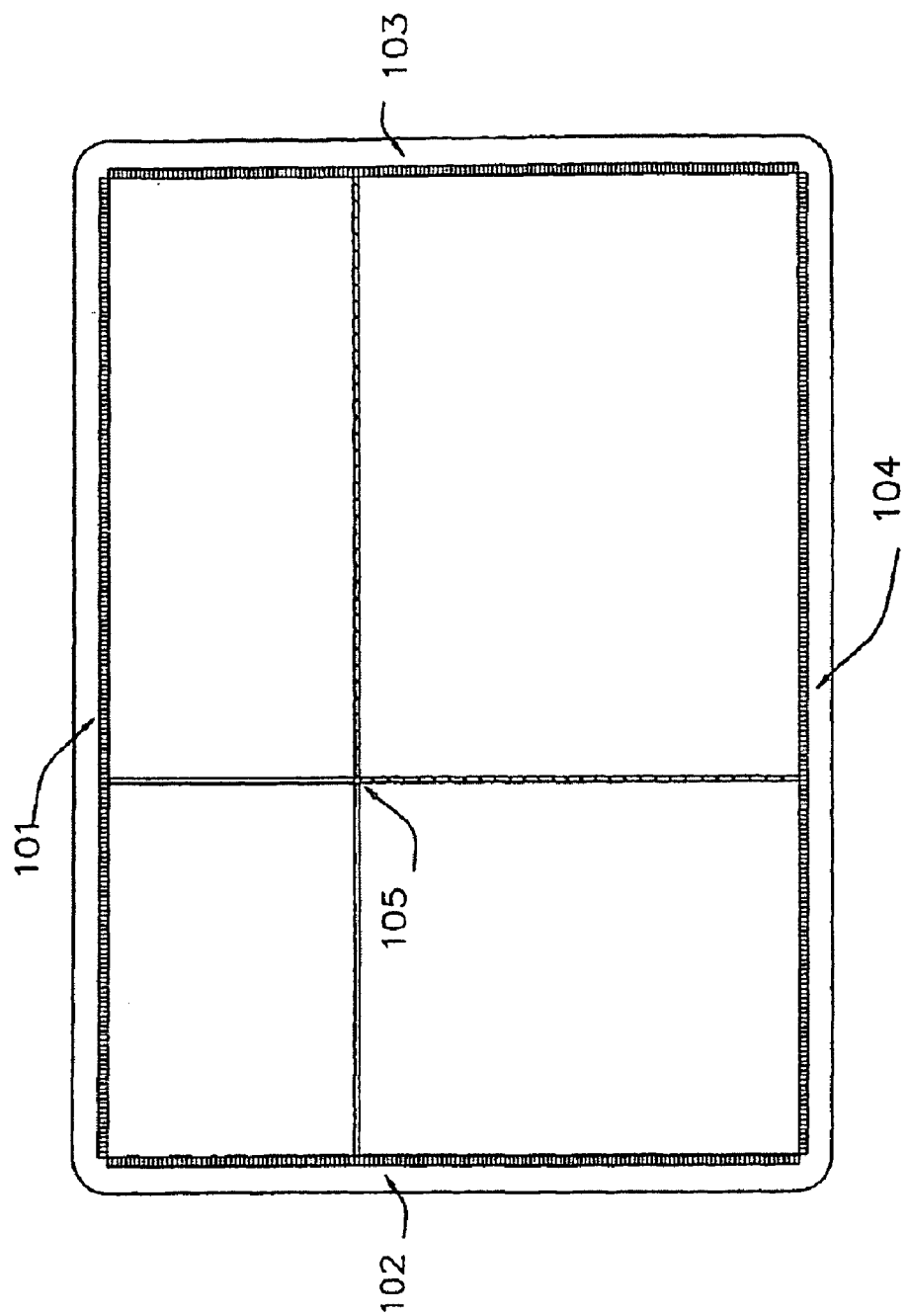
FIG. 1 shows the layout of the infrared emitting and receiving diodes of the electronic white board of this invention.
Figure 12:
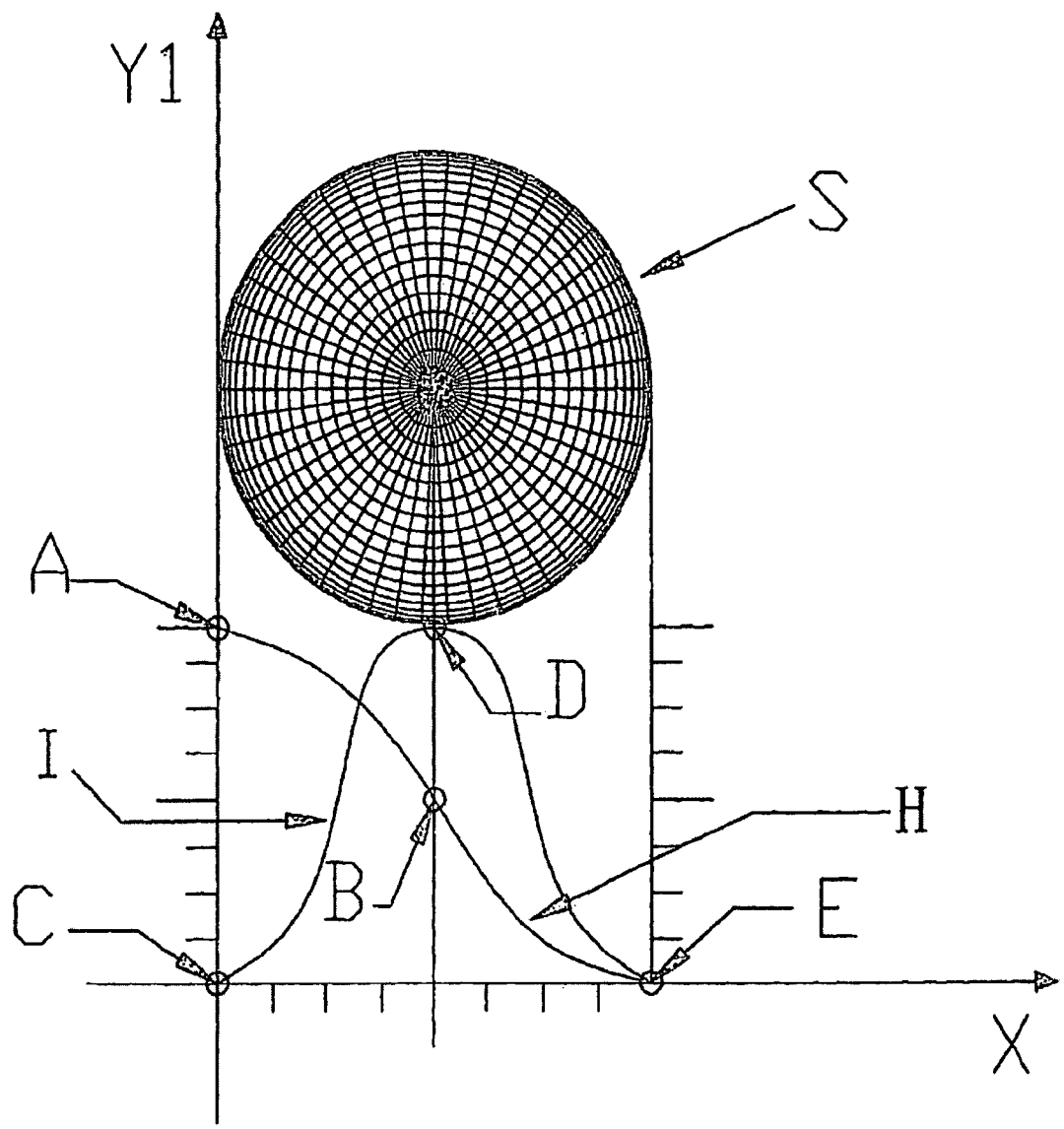
FIG. 12 shows the distribution model of light particles around the light axis, and voltage variation on the analog-digital A/D converter.

The Inverse Square Law in optical theories, i.e., the density of light particles (light beam) is inversely proportional to the square of the distance to the light axial center, establishes the optical particle density distribution diagram S based on the emitting light beam section model as shown in FIG. 12, and the curve diagram FIG. 1 of density distribution of light particles in the light tunnel, where Y axis is the density of light particles in the light path or output voltage values of the receiving diode, X axis is the dimension of diameter of the light path. In curve I, point D is the vertex of optical particle density, i.e., the center of the tunnel; points C, E is the nadir of optical particle density, i.e., the brim of the tunnel.

Blocked part of the light path is bow shaped. During the blocking process, the bow gradually grows, i.e., the height of the bow grows. A standard curve H showing the variation of the quantity of light particles (light beam) in the light path caused by moving of the object along X axial direction can be deduced by dividing variation of effective area of the light tunnel when the object is moving in X axial direction (i.e., effective area of the light tunnel (area of the unblocked bow shape)=total area of the light tunnel—area of the blocked bow shape) into infinite number of sections, then use model S of the optical particle density distribution in the tunnel and through calculus calculation. This standard curve is a standard curve equation with a tan(x) function or a multiple power standard curve equation with the blocked distance as self variable x, and variation of voltage on the receiving diode as function, wherein the point A represent the maximum quantity of light particles, since the tunnel is unblocked; and the point B represent a watershed, i.e., only half of light particles pass; and the point E represent the nadir since all of the tunnel is block, allowing no light particles to pass.

Because the quantity of light particles (light bean) in the light path=the quantity of light particles (light beam) received by the receiving diode, and the variation of the quantity of light particles (light beam) is lineally proportional to the output voltage on the receiving diode, i.e., when said light path is blocked, the standard curve for optical particle variation is the curve of the variation of output voltage when the infrared diode is receiving infrared beams.

This invention uses an A/D analog-digital converter the variation curve of the output voltages on the receiving diode to moving distances. It can divide the amplitude of analogy voltages output by the infrared emitting diode into many portions, and then quantitizes them into discreet values. If an 8 bit A/D converter is used, the output can be quantitized into $2^8=256$ different voltage values. We can set the full meter voltage of the A/D converter as the voltage value at point A in standard curve H, with the highest value 255 and the lowest value 0, and then interpolate on standard curve H to located corresponding 256 X coordinate on the x axis. Therefore, by substituting voltage values from the A/D converter into said standard curve equation, we can obtain the length (height of the blocked bow shape) of the blocked part when the object moves in the light path, then compare and interpolate this height (length) against standard data table established from sample data from experiments to obtain the final precise length value d. Said standard data table saved in the microprocessor or the computer is obtained through experiments by listing one to one relationship between voltage values generated by infrared receiving diodes when object moving in the light path and the width di blocked by the object in the infrared light path, and by combining different diameters of emitting and receiving diodes. The microprocessor can obtain the value of the width $d_i$ blocked by the object in the infrared light path by looking up said table directly with the voltage values generated by the infrared receiving diode, thus capture, identify, recur and save the coordinates of moving objects on the infrared electronic white board; or it can interpolate the width $d_i$ blocked by the object in the infrared light path obtained from the curve function with said table to obtain more precise values.

Figure 13:
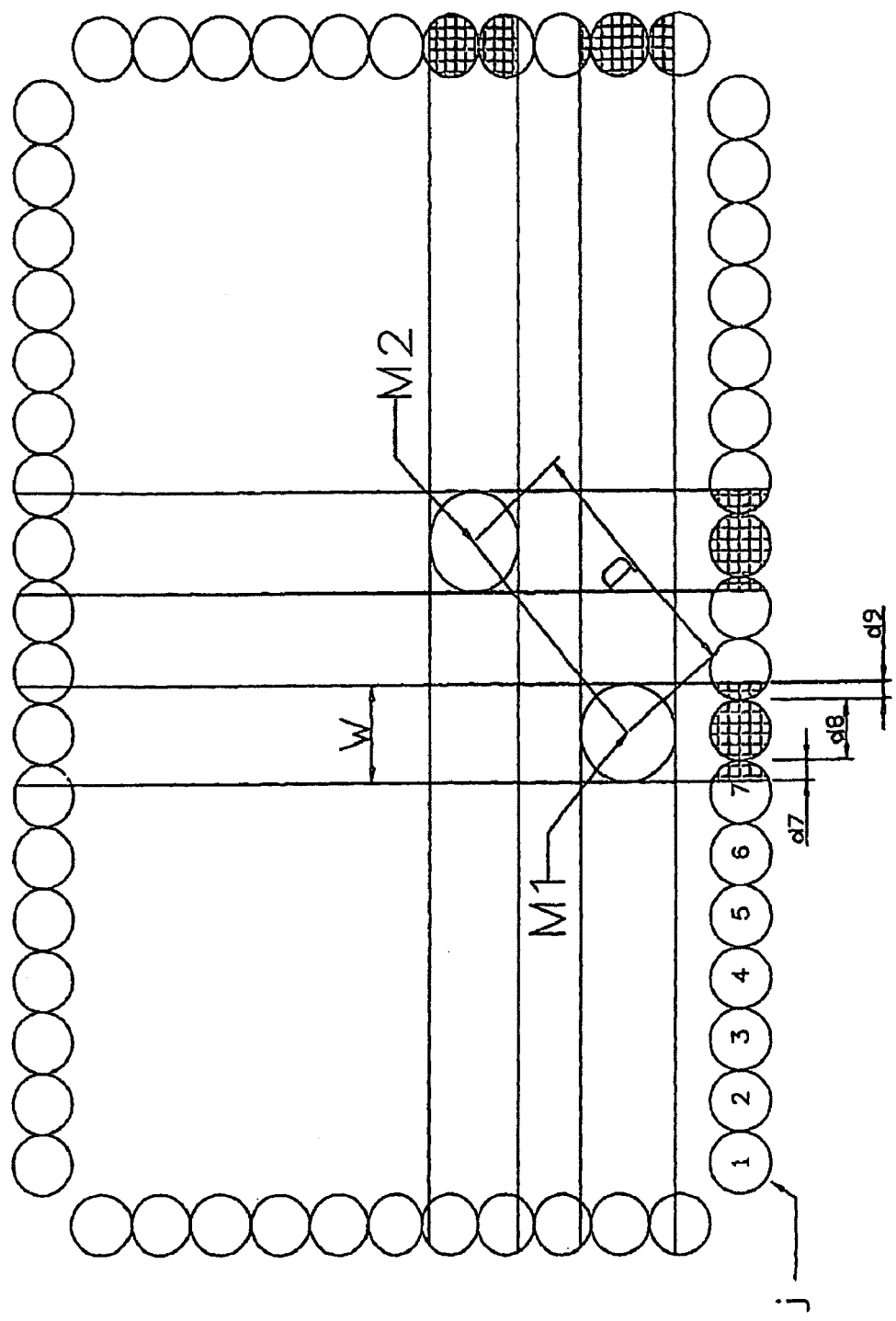
FIG. 13 is the novelized diagram dimension and coordinates of moving objects

As shown in FIG. 13, assuming L is the dimension of the receiver (emitter), W is the diameter of the blocking object, d is the width blocked by the object in the light tunnel, i.e., the height of the blocked row shape, j is the sequence number of receiving diodes on X axis, k is the sequence number of receiving diodes on Y axis.

As shown in FIG. 13, the diameter of the moving object M1 (i.e., width of the blocked part of the receiving diode) is:

$$W = d_7 + d_8 + d_9$$

It can be deduced that the mathematic expression for the diameter of the moving object is:

$$W = \sum_{i=j}^{N} d_i = d_j + d_{j+1} \wedge d_{j+n}, \quad N = j+n$$

The mathematic expression for the X, Y coordinates is:

$$X = j \times L - d_j + \left(\sum_{i=j}^{N} d_i\right) \div 2$$

$$Y = k \times L - d_k + \left(\sum_{i=k}^{N} d_i\right) \div 2$$

Substituting known numbers j, k, L, d into said formula, dimension and precise coordinate of any blocking object can be obtained.

As shown in FIG. 13, the distance between moving objects M1(X1, Y1) and M2(X2, Y2) is:

$$D = \sqrt{(X2-X1)^2 + (Y2-Y1)^2}$$

It can be deduced that the mathematic expression of the distance between coordinates of an object captured in cycle n and cycle n−1 is:

$$D_n = \sqrt{(X_n - X_{n-1})^2 + (Y_n - Y_{n-1})^2}$$

The mathematic expression of the distance between two moving object m, m−1 when multiple objects are captured in cycle n is:

$$D(m) = \sqrt{(X(m)_n - X(m-1)_n)^2 + (Y(m)_n - Y(m-1)_n)^2}$$

If an object m is captured during two consecutive cycles n, n−1, the mathematic expression for distance of coordinates of the object m in different cycles is:

$$D(m)_n = \sqrt{(X(m)_n - X(m)_{n-1})^2 + (Y(m)_n - Y(m)_{n-1})^2}$$

To further increase precision, a standard data table of variation of output voltages from the receiving diode obtained through experiments is required to be established in the microprocessor or the computer. Said voltage variation values represent the changing process of the light path from large to small when blocked by a moving object; the table has different voltages values and corresponding moving positions or distance. The purpose of building the standard table is to using the data from experiments as reference, and compare it against voltage values from the A/D converter during scanning process, then to obtain moving coordinates, or to compare or interpolate the said values against coordinate values obtained from standard curve equations to finally obtain precise coordinates.

While capturing objects, to obtain moving tracks of objects on the white board, the white board must rapidly scan through every emitting and receiving units receptively from the first pair of emitting and receiving diodes to the last units, thus finish on scanning cycle, then continuously and rapidly report said scanning cycle to capture coordinates of moving objects and instantly upload captured coordinates to the computer. To precisely realized track recurrence of handwriting which including breaking strokes or continuous strokes, it is necessary to make precise judgment on braking or continuous strokes. Through application software, this invention obtains the D values by calculating the distance between the coordinate captured during last cycle and the coordinate captured during the current cycle, then use this value to judge if a coordinate is a point or the starting of new line, or just continues a line. If it continues a line, the application connects two adjacent coordinates with a line; if not, the application draws a point on the coordinate with simultaneous display on the computer screen. This way, capture and recurrence of the moving object track are realized.

The advantage of using difference of distance to judge two adjacent coordinates is that it can simultaneously replay the tracks of multiple captured coordinates. This method is different from methods used by existing infrared touch screen or some computer handwriting boards. Existing track recurrence methods depend on by judging if objects leave the capturing range (or surface) to decide if a coordinate is starting a new line or continuing a line. If multiple users are writing on the capturing surface (i.e., the white board), it is very complex and difficult to use this method to judge which and when a subject leave the capturing range. Therefore it is very difficult to recur tracks of hand writing on the while board by multiple users. The method in this invention happens to conquer the obstacle of this multiple user issue.

Capturing of objects is through scanning, starting from the first pair of emitting and receiving diode to the last pair, to complete a scanning cycle. Automatic identification of erasing devices is based on its size W value. After one scanning cycle, if it can be decided that the dimension of the moving object is bigger than the size (defined by users through software) of the pen (pen head), the moving object on the white board can be it is determined as an eraser. Under normal conditions, the identified objects should be close to a circle. This erasing device could be a white board eraser, or a finger, since when a finger moves on the surface, its contact surface is similar to an ellipse, which can be treated as a circle. We will describe how a round erasing device is captured, processes and realized.

The basic principle of capturing the moving track of the erasing device or replay of screen erasing effects is the same as that of the pen capturing. From previous description we know that the dimension of the moving object can be calculated through the blocked length of the receiving diode. Similarly, through following formula we can obtain the diameter of the erasing device:

$$W = \sum_{i=j}^{N} d_i = d_j + d_{j+1} \wedge d_{j+n}, \quad N = j + n$$

After the computer receives the coordinate, and the diameter W of the object, application software draws a white solid circle at the coordinate (X,Y) of the moving object using diameter W, then following the movement of the object, repetitively draw solid circles of diameter W at the received coordinates (Xn, Yn), thus realizes erasing functions.

Of course, this method can only be applied to regular circles. If the object were rectangular or square, the user must set the erasing device perpendicular to the white board to go through a identification scan by the system, so that the length and width of the rectangular or square can be captured and the length of he diagonal is calculated, then by calculating rotated angle of the rectangular or square using algebra principles, erasing area and track can be obtained.

After explaining the working principles of this invention, following are descriptions of structure and application programs using attached figures:

FIG. 1 shows the layout of the infrared emitting and receiving diodes used in this invention. Wherein an infrared emitting array is divided into two parts: one part 102 is located at the left edge of the white board, the emitting diodes thereof are aligned in sequence numbers for emitting and scanning on Y axis; the other part 101 is located at the top edge of the white board, the emitting diodes thereof are aligned in sequence numbers for emitting and scanning on X axis. The infrared receiving array is also divided into two parts: one part 103 is located at the opposite side of the part 102, the receiving diodes thereof are aligned in sequence numbers for receiving and scanning on Y axis; the other part 104 is located at the opposite side of the part 101, the receiving diodes thereof are aligned in sequence numbers for receiving and scanning on X axis. All of parts 101, 102, 103, 104 are modulized and formed with connectors, with each module comprising of emitting and receiving units.

Wherein on X axis, each paired emitting and receiving diodes are one to one related, and has same X axial sequence number. When there is no object moving between the emitting diode and the receiving diode, the receiving diode can normally receive the high frequency pulse signal sent by the emitting diode. If an object moves on X axial direction, infrared signal sent by one or more emitting diodes are blocked by the object 105, such that the corresponding receiving diode can not receive normal pulse singles. At the same time, according to the sequence number of the receiving or emitting diodes on that location, by the means of the A/D conversion program, the width of the blocked portion in the light path blocked by the moving object can be calculated. Then, by using the following formula, coordinate value X of the object 105 moving on the X axis can be known.

Similarly, on Y axis, each paired emitting and receiving diodes are one to one related, and has same Y axial sequence number. If an object moves on Y axial direction, certain receiving diode on Y axis $$X = j \times L - d_j + \left( \sum_{i=j}^{N} d_i \right) \div 2$$

$$Y = k \times L - d_k + \left( \sum_{i=k}^{N} d_i \right) \div 2$$

cannot receive pulse signals sent by the emitting diode; by the means of the above mentioned method, coordinate value Y of the object 105 moving on the Y axis can be obtained. By repeatedly outputting pulse signals to each of the infrared emitting diodes on X and Y axis, scanning is performed, and at the same time, signals from each corresponding receiving diode are read, thereby the track of the moving coordinates of the object 105 on X and Y axis is obtained.

Figure 2:
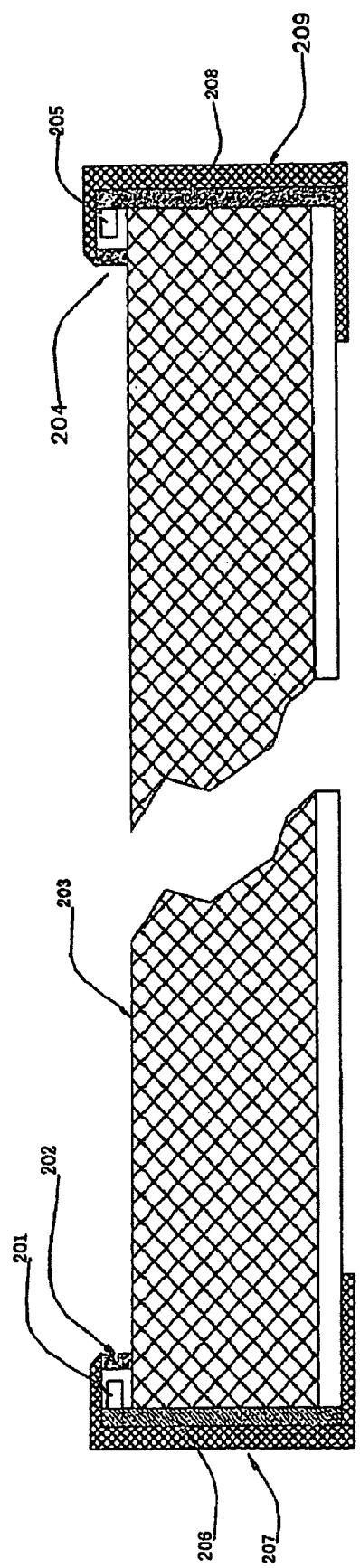
FIG. 2 is a sectional schematic view of the infrared emitting and receiving diodes on the electronic white board.

FIG. 2 is a sectional schematic view of the invention, wherein 203 is the writing surface, which can be made of any surface materials including durable ceramic metal white board, or economical plastic splayed metal white board. 201 is an infrared emitting diode on the left or top edge of the white board. 206 is the circuit board of the infrared emitting module. 202 is a filtering device which is located between the infrared emitting diode and the receiving diode, made of dark red transparent plastic materials, and is mainly used for filtering out interfering day lights. This device can increase the quality of received infrared signal to avoid malfunction caused by error codes. 205 is an infrared receiving diode located on the right or bottom edge of the white board. 208 is the circuit board of the infrared receiving module. 204 is an infrared filtering device same as 202. 207, 209 are aluminum alloy outer frames surrounding four side of the white board to protect infrared diodes. 201 and 205 are one to one related, having same sequence numbers on X or Y axis. Circuit boards 206, 208 of the infrared emitting and receiving diodes are installed on two sides of the outer frame, perpendicular to the white board surface.

Figure 3:
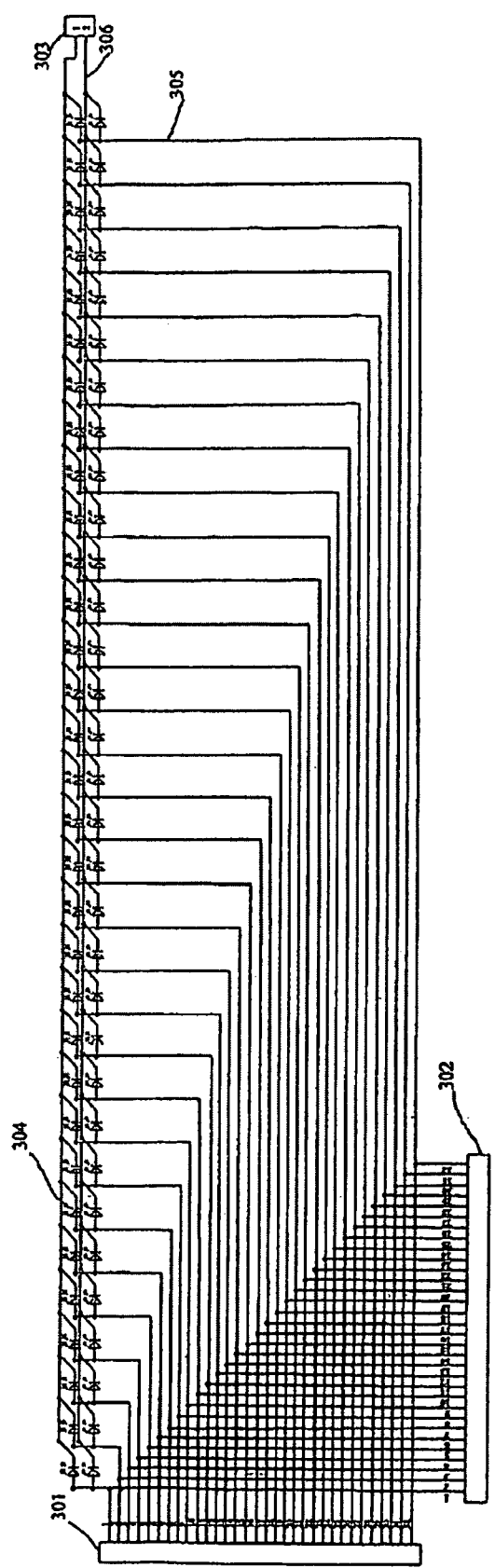
FIG. 3 is the schematic circuit diagram of the infrared emitting and receiving modules.

FIG. 3 is the schematic circuit diagram of infrared emitting and receiving modules, wherein each infrared diode on the emitting module is connected in the form of an array. Arrangement and dimension of the arrays can be decided based on the dimension of the white board. One of the arrangements of arrays of this invention is as follows, but it is not a limitation to this invention. As shown in the figure there is a 32×2 array, in which there are 32 row drive lines 305, with one end connected with two connecters 301, 302 respectively, and the other end connected with positive poles of each infrared emitting diode or infrared receiving diode. There are 2 column drive lines 306, with one end connected with the connector 303, the other end connected with negative poles of each infrared emitting diode or receiving diode 304.

Figure 4:
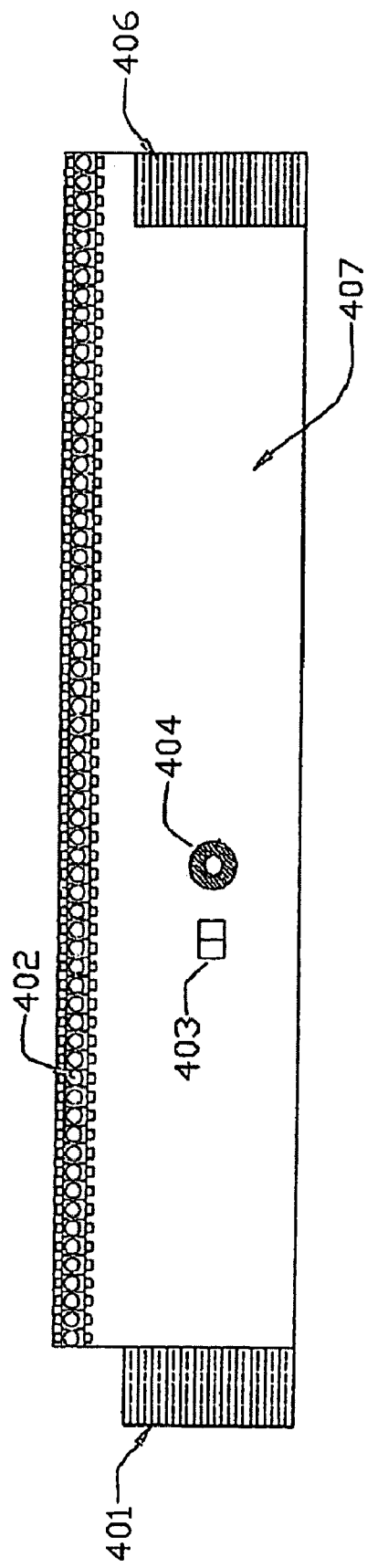
FIG. 4 is the circuit board diagram of the infrared emitting and receiving diode modules.

FIG. 4 is the layout of components on the printed circuit board (PCB) of infrared emitting or receiving diode modules, wherein on two ends of the PCB 407 are two row drive line connectors 401 and 406 (i.e., 301 and 302 in FIG. 3) connected with 32 row drive lines, which are used for connecting row drive lines between modules. There are two connectors 403 (i.e., 303 in FIG. 3) connected to column drive lines. There are totally 64 infrared emitting diodes or receiving diodes soldered directly on the PCB. The positive pole of each emitting or receiving diode is connected with connectors 401 and 406, and the negative pole is connected with column drive lines, forming a 32×2 array. 404 is a bolt hole for fixing said module.

Figure 5:
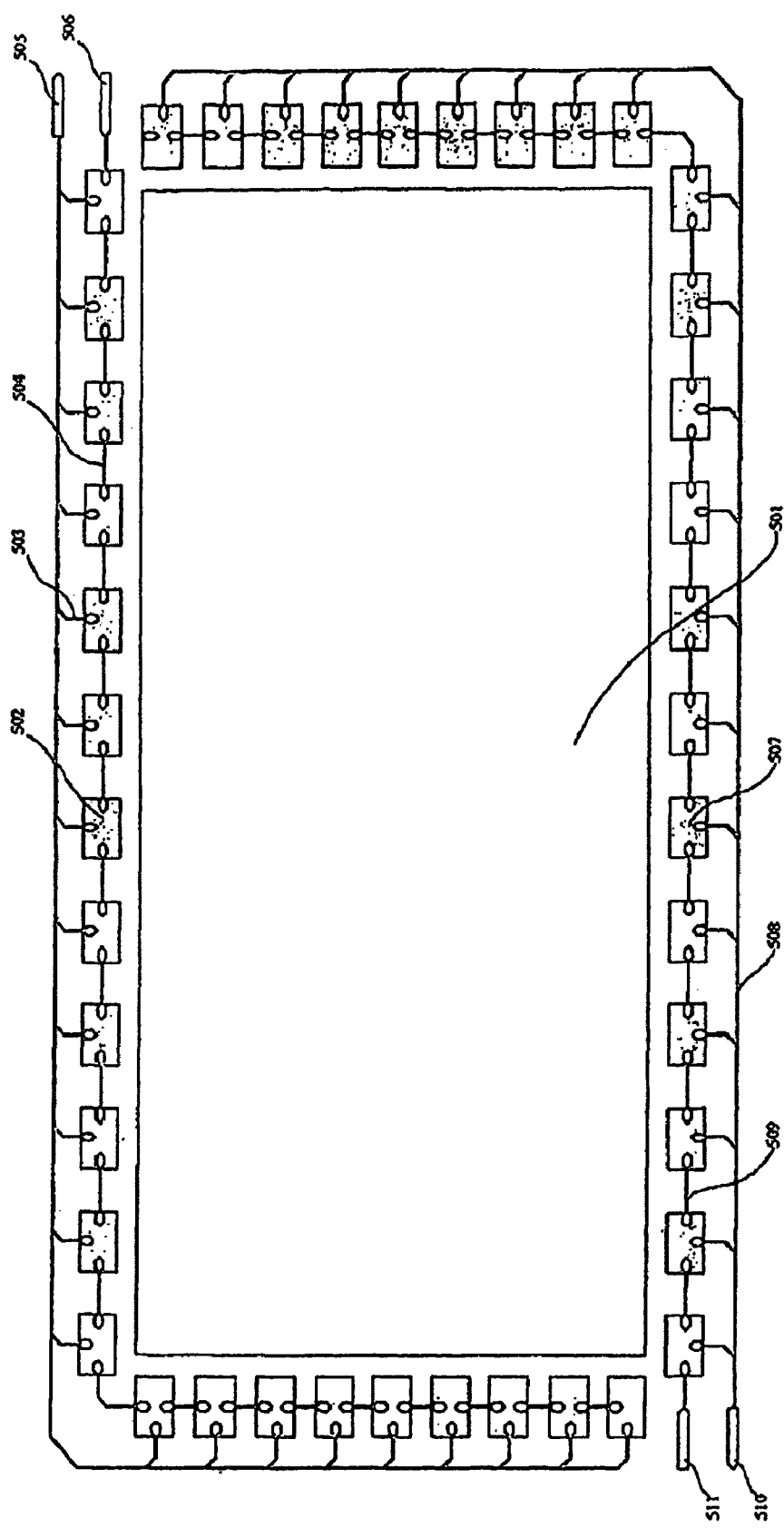
FIG. 5 is the schematic diagram showing the connections between the infrared emitting and receiving diode modules.

FIG. 5 is a schematic diagram showing the connection between the infrared emitting and receiving diode modules. As shown in the diagram, the white board 501 is surrounded by multiple infrared modules, wherein, the quantity of infrared modules is decided by the dimension of the white board. As shown in the diagram, the emitting array has 21 emitting modules, among which 9 modules are located at the left side of the white board 501, used for infrared emitting and scanning on Y axis; 12 modules are located on the upper edge of 501, used for infrared emitting and scanning on X axis. Similarly, on the opposite side of the emitting modules, there are same quantity of receiving modules. If the size of infrared diodes used in this invention is 2 mm, effective writing area of the white board can be calculated according to following method: dimension of the module is 64×2 mm=128 mm, and the scanning range on X axis is 128×12 (emitting module) =1536 mm; with the same method, the scanning range on Y axis is calculated to be 1152 mm, thus effective area of the white board is 1536×1152 square millimeters. To increase or reduce the dimension of the white board, we can adjust the number of modules used, or use infrared diode of different size. If the size is 5 mm, the dimension of the white board is 3840 mm×2880 mm.

As mentioned above, modules are connected with each other with connectors. As shown in FIG. 5, the emitting modules 502 are connected head to tail to form a 32×42 infrared emitting array, wherein there are totally 32 row drive lines 504 between modules, then the modules are connected with the column driver port 506. There are 21 pairs, 42 column drive lines 503 of emitting modules connected with the row driver port 505 of the emitting array of the control panel. Receiving modules are connected in the same way. Receiving modules 507 are connected head to tail. There are 32 row drive lines 509 connected with the row driver port 511 of the receiving array. There are 42 column drive lines 508 connected with the column driver port 510 of the receiving array, forming a 32×42 infrared receiving array.

There are 1344 emitting diodes in the 32×42 infrared emitting array, and 1344 receiving diodes in the 32×42 receiving array, for capturing moving objects on the white board. Scanning is started from the first pair of emitting and receiving diodes, and is followed according to sequence number, until all 1344 pairs of emitting and receiving diodes are scanned, thereby a scanning cycle is completed. To capture smooth and continuous moving coordinates, the faster the scanning cycle, the better, the more scans in one second, the better.

Figure 6:
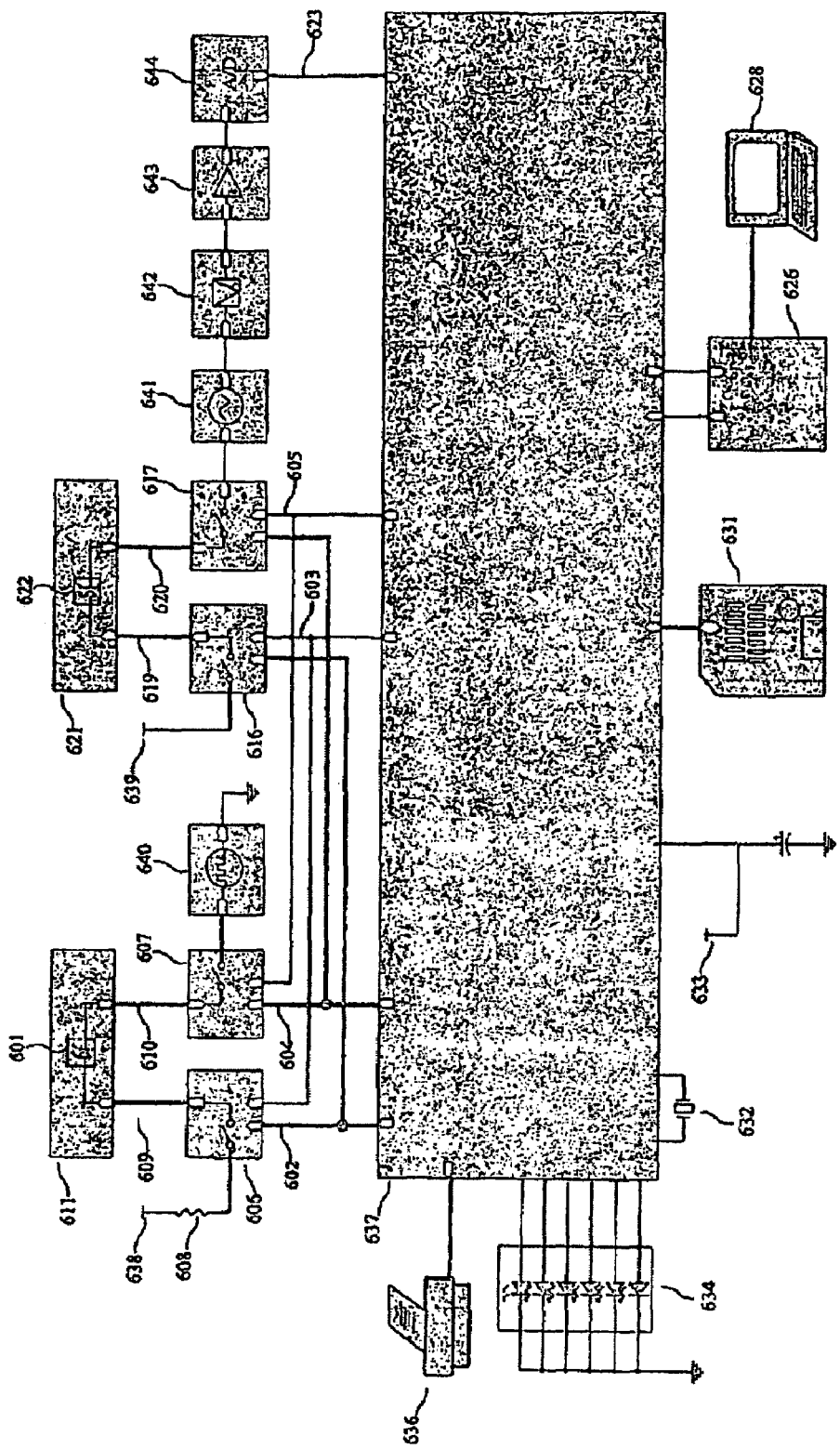
FIG. 6 is the schematic diagram of the control circuit of the electronic white board system.

FIG. 6 is the schematic diagram of the control circuit of the core part of this invention, comprising four parts:

The first part is microprocessor based controller comprising a microprocessor 637, mainly used for outputting the address signals of the emitting or receiving diodes to be scanned, controlling the conducting of a pair of emitting and receiving diodes, and recording moving positions of the object and uploading coordinate data to the computer, and so on. The LED indicator 634 indicates working status of the white board. The power source 633 supplies power to the microprocessor. 632 is a crystal to generate oscillating frequency required for the microprocessor.

The second part is the control circuit for infrared emitting, wherein one input terminal of the row driver 606 of the emitting array is connected with the positive pole of the power source 638 through a current-limiting resistance, providing voltage to emitting diodes, and the output terminals of the row driver are 32 row drive lines 609 connected with the positive pole of each emitting diode on the emitting array 611. Meanwhile, the input port of the column driver 607 comprises 42 column drive lines 610 connected with the negative pole of each emitting diode of the emitting array, and the output port of the column driver is connected with a high frequency modulated signal generator, which generates high frequency pulse signals and emits infrared signals with high frequency modulation.

Wherein the row driver 606 switches on the input port and output terminal according to the "row" address code from the microprocessor, i.e., a row of the row driver lines 609 pointed by said address code are conducting; the column driver 607 switches on the output port and input terminal according to the "column" address code from the microprocessor, i.e., a column of the column driver lines 610 pointed by said address code are conducting; circuit 611 comprises an array of emitting diodes linked by 21 emitting modules, as shown in FIG. 5; unit 601 is one of the switched-on emitting diodes in circuit 611; the high frequency modulated signal generator 640 provides a high frequency modulation of about 300 KHz to the conducting emitting diode 611.

The third part is the control circuit for infrared receiving, wherein one input port of the row driver 616 of the receiving array is connected with the positive pole of the power source, providing voltage to receiving diodes, and the output terminal comprises 32 row drive lines 619 connected with the positive pole of each receiving diode on the receiving array 621. The input port of the column driver 617 comprises 42 column drive lines connected with the negative pole of each receiving diode on the receiving array 621, and the output terminal is coupling connected with a band-passing filter 641, which can filter out useless interfering signals. Then, useful high frequency signal is amplified through a multistage band-pass amplifier 642, and demodulated through a modem 643. The optical-electronic analog signal, after being demodulated, is input into the analog-digital (A/D) converter 644. The 8 bit binary digital signal after A/D conversion is output to the microprocessor.

Wherein the row driver 616 switches on the input port and output terminal according to the "row" address code from the microprocessor, i.e., a row of the row drive lines 619 pointed by said address code is conducting; the column driver 617 switches on the output port and input terminal according to the "column" address code from the microprocessor, i.e., a column of the column drive lines 620 pointed by said address code is conducting. Similarly, the circuit 621 comprises an array of receiving diodes linked by 21 receiving modules, as shown in FIG. 5; the unit 622 is one of the switched-on receiving diodes in the circuit 621.

The row drivers 606, 616 of the above mentioned emitting and receiving arrays are connected with the microprocessor through the row address bus 602; and the column drivers 607, 617 of the emitting and receiving arrays are connected with the microprocessor through the column address bus. Drivers 606, 607 are controlled by the microprocessor through the address bus 602 with 5 lines, i.e., there are $2^5$ choices of combinations, providing different addressing for 32 row drive lines; drivers 616, 617 are controlled by through the address bus 604 with 5 lines, providing different addressing for 32 column drive lines.

In the above mentioned circuits, the driver circuits 606, 607, 616, 617 can each comprises one or more units of driver chips. When the row drive lines or column drive lines of the drivers are not enough for use, more drive chips are needed. By the means of the optional lines 603, 605, different chips can be selected to be used in scanning of row and column drive lines. Each driver needs one optional line. If the row driver circuit 606 can drive 32 drive lines, one driver and one optional line is enough. When the column driver circuit 607 needs to have driving capacity for 42 lines, 2 drivers are needed, and at the same time 2 optional lines are needed to select driver chips. In this way, without increasing address lines, driving capacity of the driver circuit can be doubled by doubling the number of driver chips, i.e., by using 2 drivers with 32 line driving capacity, and using 2 optional lines, i.e., the emitting row driver 606 and the receiving row driver 616 can be connected with the microprocessor 637 through the row selecting address bus 603, the emitting column driver 607 and the receiving column driver 617 can be connected with the microprocessor 637 through the column selecting address bus 605, thus the array of 64 row or column drive lines can be driven without increasing the number of address bus. In this embodiment, it is enough to use two driver chips for driving 42 column drive lines of this device.

The forth part is the external device mainly comprising a storage device such as a multi-media card (MMC) 631 or a SmartMedia (SD) card, and a communication integrated circuit 626 controlling the RS232 serial port. Since the input voltage of the RS232 serial port of the computer 628 is different from the output voltage of the microprocessor, the communication between this invention and the computer is through the integrated circuit 626. 626 converts voltage signals from the microprocessor 637 to voltage signals recognizable by the RS232 serial port of the computer, then the signals from the RS232 port are read in by the application program. After processing, the microprocessor uploads captured data including coordinates of moving objects, dimension of objects, and scanning cycle sequence numbers to the computer through RS232, and saves the data into the memory 631. When the device is needed to be operated independently, this invention can directly using the microprocessor 637, after reading data saved in the storage device 631, then the data is transmitted through the parallel bus 635, so that the captured picture is output directly to the parallel ports for printing.

Figure 7:
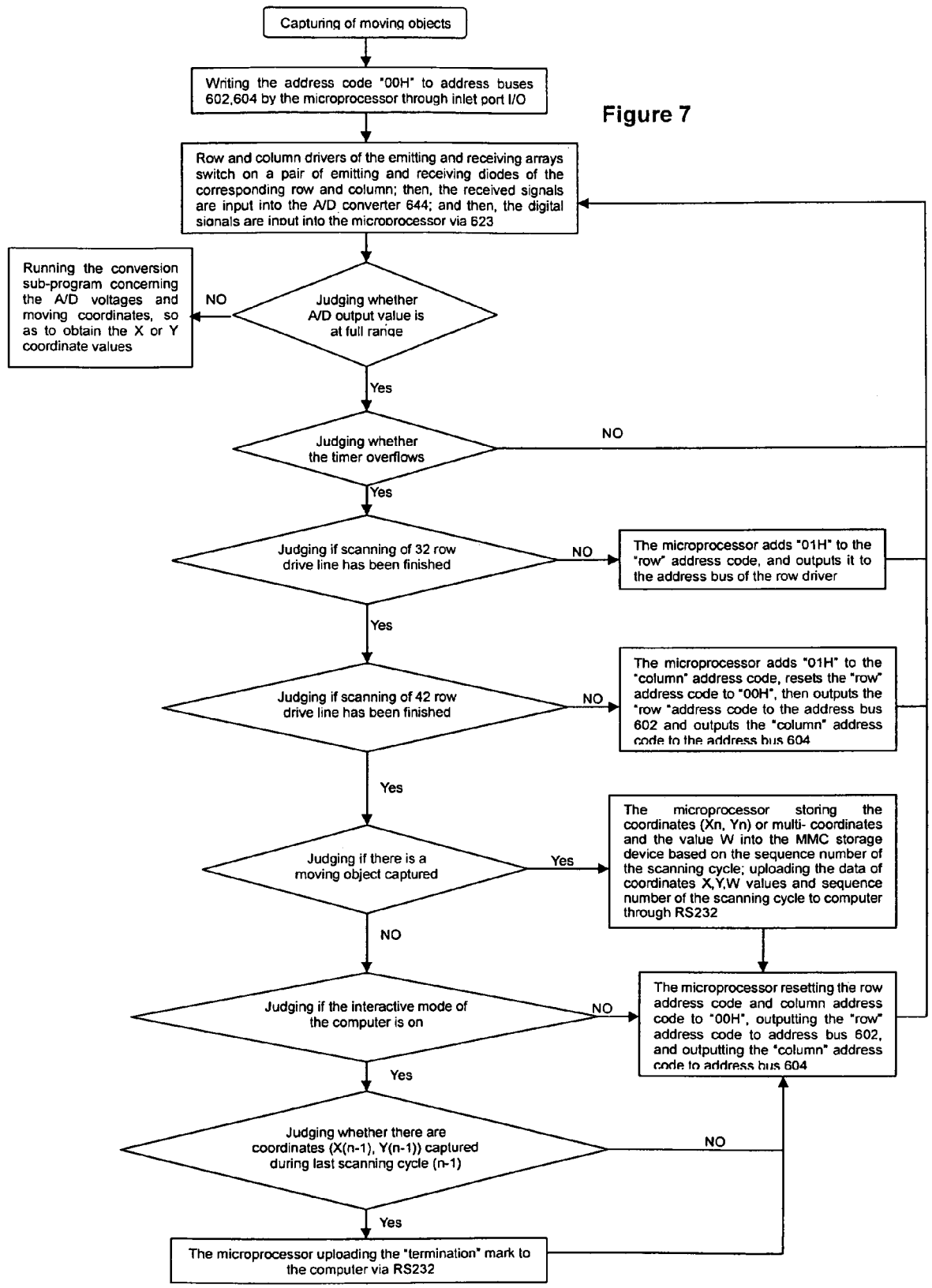
FIG. 7 is the flow chart for moving object capturing

The main steps of this invention for capturing and storage of the coordinates of moving objects will be described in details according to the flow chart of one embodiment as shown in FIG. 7:

Assuming: n is the scanning cycle sequence number; i is a constant ranging from 1 to ∞; W is the diameter of the moving object; L is the physical dimension of the receiving diode; m is the object ID number; X(m) is the X coordinate of the object m; Y(m) is the Y coordinate of the object m.

1. The microprocessor writes the "row" and "column" address codes into "00H", and outputs it to the row and column driver address bus of the emitting and receiving diode array through address ports;
2. Row and column drivers of the emitting array switch on the emitting diode located on the corresponding row and column, said diode then starts to emit infrared high frequency modulated pulses; at the same time, row and column drivers of the receiving array switch on the corresponding receiving diode, since each pair of emitting and receiving diode is located on the same optical axis, corresponding one to one, the receiving diode starts to output analogy pulse signals;
3. Following step 2, a receiving conversion circuit converts the received analog pulse signal into analog voltage range signal, then inputs it to the analog-digital (A/D) converter, which in turn converts the analog voltage amplitude signal into discrete values;
4. Following step 3, the microprocessor reads A/D voltage values from the A/D signal input port, and makes judgments: if the value is near the peak value of the A/D voltage curve, i.e., when A/D value is at full range, the judgment is that there is no blocking event, and going to the next step; otherwise, the judgment is that a blocking event happens, then the microprocessor runs the conversion sub-program concerning the A/D voltages and moving coordinates, so as to obtain the Xn or Yn coordinate values, and going to the next step;
5. Following step 4, judging whether the microprocessor timer overflows, if yes, going to step 6; otherwise, back to step 2;
6. At this stage, a scanning cycle for a unit, i.e., scanning for a pair of emitting and receiving diodes, has accomplished; then the microprocessor judges if scanning of all row drive lines of all emitting and receiving arrays have been finished; if yes, going to step 8; otherwise going to the next step;
7. The microprocessor adds "01H" to the "row" address code, and outputs it to the address bus of the row driver, then scanning of the next row of the emitting and receiving arrays starts; back to step 2;
8. Judging whether scanning of all column drive lines of all emitting and receiving arrays is finished, if yes, going to step 10; otherwise going to the next step;
9. The microprocessor adds "01H" to the "column" address code, resets the "row" address code to "00H", then outputs the "column" address code to the address bus of the column driver, and outputs the "row" address code to the address bus of the row address driver; the scanning of the next column of the emitting and receiving arrays begins, then back to step 2;
10. At this stage, a full scanning cycle, i.e., scanning of all emitting and receiving diodes, has finished; a check is then made on if there is an moving object captured; if not, going to step 12; if yes, going to the next step;
11. If a single object is captured, storing the coordinates (Xn, Yn) of the moving object and the W values into the MMC storage device connected with the microprocessor based on the sequence number n of the scanning cycle, and uploading the data to computer through RS 232 port; then going to step 14; if multiple objects are captured, storing coordinates (X(m)n, Y(m)n), (X(m+1)n, Y(m+1), . . . , (X(m+i)n, Y(m+i)n) of the moving objects captured in this cycle and W(m), W(m+1), . . . , W(m+i) values into the MMC storage device connected with the microprocessor based on the sequence number n of the scanning cycle, and uploading the data to computer through RS 232 port; then going to step 14;
12. Judging if the interactive mode of the computer is on, if not, going to step 14; if yes, going to the next step;
13. Judging if the coordinate (X(n−1), Y(n−1)) was captured during last scanning cycle, if yes, uploading a "terminated" mark through the RS232 port to the computer to notify the application program that the moving object has left the capturing range; then going to the next step; if not, going to the next step;

14. The microprocessor resets the row address code to "00H", and the column address code to "00H", and outputs the "column" address code to the column driver address bus, the "row" address code to the row driver address bus; then returning to step 2 to continue next scanning cycle.

By repeating steps 1-14, the microprocessor uploads captured coordinates of moving objects to computer application program through RS232, and then the captured coordinates are connected and re-constructed on the computer screen by the means of the computer application program, thus the screen recurrence is realized.

Figure 9:
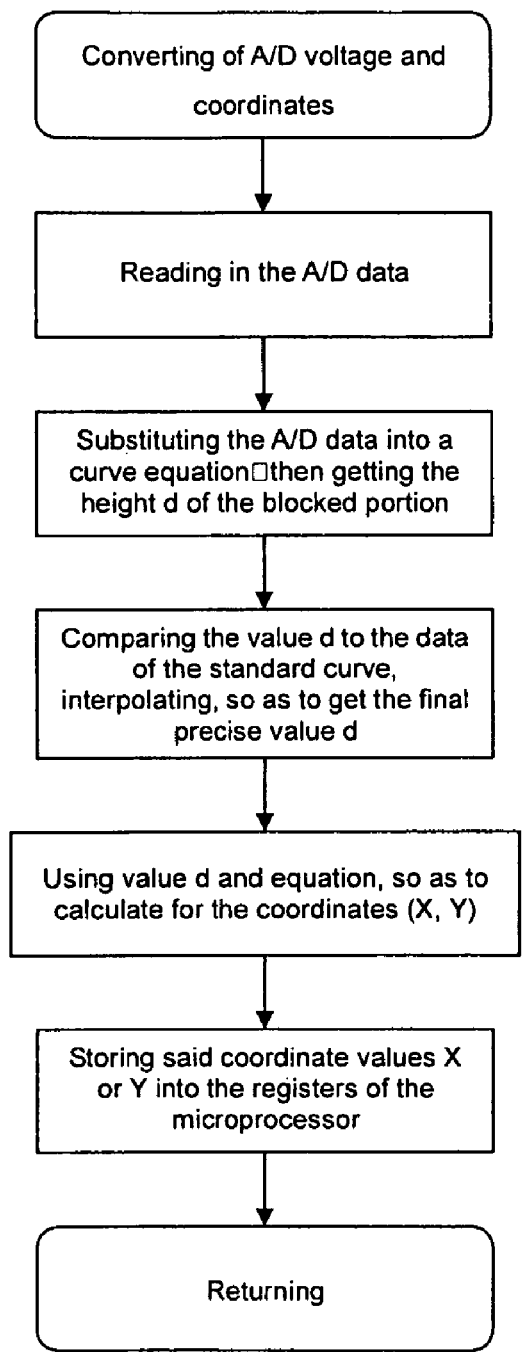
FIG. 9 is the flow chart of the conversion sub-program for the analog-digital (A/D) converter.

The main steps of this invention for conversion of the A/D voltage and moving coordinates will be described in details according to the flow chart of one embodiment as shown in FIG. 9:

Assuming: L is the dimension of the receiving diode (emitting diode); W is the diameter of the blocking object; d is the width of the blocked portion in the light path blocked by the object, j is the sequence number of the receiving diode on X axis, k is the sequence number of the emitting diode on the Y axis; X(m) is the X coordinate of the object m; Y(m) is the Y coordinate of the object m.

1. After the microprocessor reads in the data from the A/D converter, it substitutes the data into a standard curve equation to get the length or width di of the blocked portion in the light path of this receiving diode by the blocking object, i.e., the height of the bow shape of the blocked portion;

2. Then comparing the value di to the data table of the output voltage variation curve of the receiving diode collected from experiments, interpolating, valuing, so as to get the final precise position di;

3. Using the following equation, by the means of substituting the known numbers j, k, dimension L of the receiving diode, height di of the bow shape of the blocked portion in the light path, calculating for the coordinates, the final moving positions on X, Y axis of the object captured during scanning cycle n are:

$$X_n = j \times L - d_j + \left(\sum_{i=j}^{N} d_i\right) \div 2$$

$$Y_n = k \times L - d_k + \left(\sum_{i=k}^{N} d_i\right) \div 2$$

4. Storing said coordinate values Xn or Yn of the moving objects into the registers of the microprocessor; if multiple users are using the white board, i.e., more than one coordinates exist on axis X or Y, then, saving multiple (X(m), X(m+1)n ... X(m+i)n or multiple (Y(m)n, Y(m+1)n, ... Y(m+i)n) into the registers of the microprocessor;

5. Returning to the main program.

Figure 8:
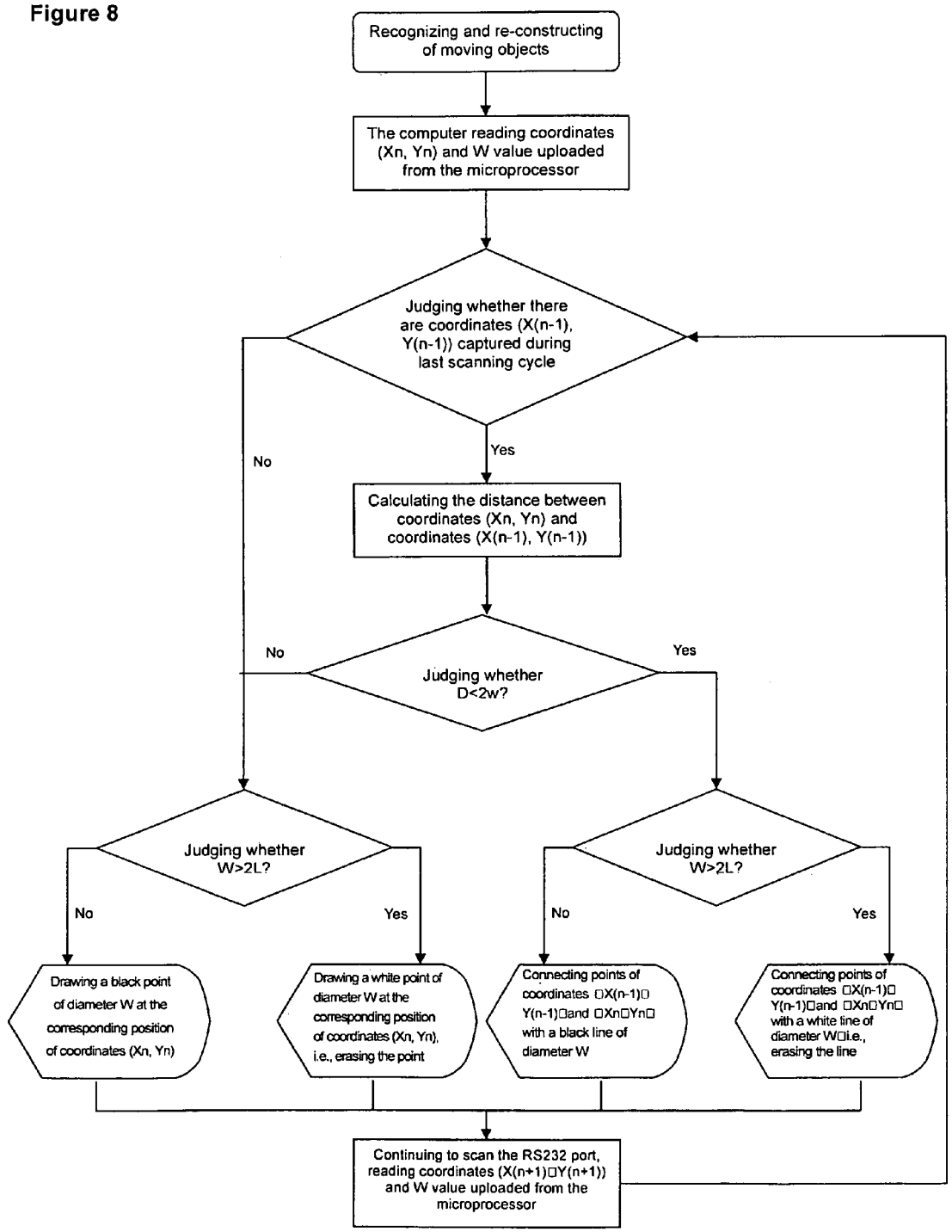
FIG. 8 is the flow chart for identification and recurrence of a single moving object.

The main steps of this invention for capturing, track reconstruction and storing a single moving object will be described in details according to the flow chart of one embodiment as shown in FIG. 8:

Assuming: n is the scanning sequence number; I is a constant ranging from 1 to ∞; W is the diameter of the moving object; L is the physical dimension of the receiving diode.

1. The computer scans the RS232 port through the application program, and after reading coordinates (Xn, Yn) values and scanning cycle sequence numbers uploaded from the microprocessor, the application program starts to judge whether there are (X(n−1), Y(n−1)) coordinates captured during last scanning cycle; if not, going to step 3; if yes, going to the next step;

2. Substituting coordinates (X(n−1), Y(n−1)) captured during last scanning cycle and the current coordinates (Xn, Yn) into the equation to calculate the distance between coordinates and to reach value D, then comparing D to the standard value, which is adjusted based on users' needs, but should not be less than 2W; if D<2w, then, going to step 4; if D≧2W, going to the next step;

3. Judging whether this is a starting point of another line or a different point, then judging type of the object; assuming W≦2L, which can be adjusted based on users' needs, then, it is confirmed that the moving object is a pen, the application software starts to draw a black point of diameter W at the corresponding position of coordinates (Xn, Yn) on the screen; if W>2L, it is confirmed the moving object is an eraser, then the application software draws a white point of diameter W at the corresponding position of coordinates (Xn, Yn), i.e., erasing the point; then going to step 5;

4. Going on to judge the type of the object, if W≦2L, which can be adjusted based on users' needs, it is confirmed that the object is a pen, and connecting points of coordinates (X(n−1), Y(n−1)) and (Xn, Yn) with a black line of diameter W, then going to the next step; if W>2L, it is confirmed that the moving object is an eraser, connecting points of coordinates (X(n−1), Y(n−1)) and (Xn, Yn) with a white line of diameter W, then going to the next step;

5. Continuing to scan the RS232 port, then returning to step 1.

By repeating steps 1 to 5, points of coordinates $(X_{n+i}, Y_{n+i})$ and $(X_{n+(i-1)}, Y_{n+(i-1)})$ are connected continuously, thus the track of the moving object or handwriting can be re-constructed in real time on the white board on the computer screen, and the image can be stored or retrieved at any time based on users' needs.

The main steps of this invention for realizing simultaneously writing by multiple users, i.e., identifying, track reconstruction and storage for multiple objects are as follows:

Assuming: n is the scanning cycle sequence number, i is a constant ranging from 1 to ∞, m is the object identification sequence number; X(m) is the X coordinate of the object m, Y(m) is the Y coordinate of the object m; D is the distance between different objects; L is the dimension of emitting or receiving diode; W is the diameter of a moving object.

1. The computer scans the RS232 port through the application program, and after reading coordinate values (X(m)n, Y(m)n), (X(m+1)n, Y(m+1)n), ... (X(m+i)n, Y(m+i)n), W(m), W(m+1), W(m+i) and sequence numbers of scanning cycles uploaded from the microprocessor, then saves those data into the computer memory, and uses the W value to decide the type of objects, i.e, if W(m) or W(m+1) or W(m+i)≧2L, which can be adjusted based on users' needs, and might be W>3L or another value, if yes, it is determined that the object is an eraser, then exiting the multiple object capturing program, and going to the single object capturing program; otherwise, it is determined that the objects are multiple blocking objects, and going to the next step;

2. Substituting coordinate values $(X(m)_n, Y(m)_n)$, $(X(m+1)_n, Y(m+1)_n)$, ... $(X(m+i)_n, Y(m+i)_n)$ into the equation $$D(m+i) = \sqrt{(X(m+i) - X(m+(i-1)))^2 + (Y(m+i) - Y(m+(i-1)))^2},$$

and calculating distance between different objects within one cycle, to reach the value D(m+i); then judging if those coordinates are continuous, i.e., if D(m+i)<2W; if yes, it is determined that the object is an eraser, and going to the single object capturing program; otherwise, it is determined that the objects are multiple block objects, and going to the next step;

3. The application program starts to judge if coordinates of the moving objects $(m)_{n-1}$, $(M+1)_{n-1}$, ... $(m+i)_{n-1}$ m were captured during last scanning cycle; if object m was captured, going to the step 4; if object m was not captured, drawing a point of width W(m) at the position of coordinate $(X(m)_n$, $Y(m)_n)$, then going to the step 7; if object m+1 was captured, going to the step 5; if object m+1 was not captured, drawing a point of width W(m+1) at the position of coordinate $(X(m+1)_n$, $Y(m+1)_n)$, then going to step 7; if object m+i was captured, going to the step 6; if object m+i was not captured, drawing a point of width W(m+i) at the position of coordinate $(X(m+i)_n, Y(m+i)_n)$, then going to the step 7;

4. Substituting the coordinate $(X(m)_{n-1}, Y(m)_{n-1})$ of the object m captured during last scanning cycle and the current coordinate $(X(m)_n, Y(m)_n)$ into the formula $D(m)_n = \sqrt{(X(m)_n - X(m)_{n-1})^2 + (Y(m)_n - Y(m)_{n-1})^2}$ to calculate distance; if the result $D(m)_n \geq 2L$, then it is determined what object m drawn was a starting point of a line, or a point, then going to the step 7; if $D(m)_n < 2L$, connecting the points of coordinates $(X(m)_{n-1}, Y(m)_{n-1})$ and $X(m)_n, Y(m)_n$ with a line of width W(m), then going to the step 7;

5. Substitute coordinate $(X(m+1)_{n-1}, Y(m+1)_{n-1})$ of the object m+1 captured during the last scanning cycle and the current coordinate $(X(m)_n, Y(m)_n)$ into the formula $$D(m+1)_n = \sqrt{(X(m+1)_n - X(m+1)_{n-1})^2 + (Y(m+1)_n - Y(m+1)_{n-1})^2}$$

to calculate distance; if the result $D(m+1)_n \geq 2W$, then it is determined that what object m+1 drawn was a starting point of a line, or a point, then going to the step 7; if $D(m+1)_n \geq 2W$, connecting the points of coordinates $(X(m+1)_{n-1}, Y(m+1)_{n-1})$ and $X(m+1)_n, Y(m+1)_n$ with a line of width W(m+1), then going to the step 7;

6. Substituting coordinate $(X(m+i)_{n-1}, Y(m+i)_{n-1})$ of the object m+1 captured during the last scanning cycle and the current coordinate $(X(m+i)_n, Y(m+i)_n)$ into the formula $$D(m+i)_n = \sqrt{(X(m+i)_n - X(m+i)_{n-1})^2 + (Y(m+i)_n - Y(m+i)_{n-1})^2}$$

to calculate distance; if the result $D(m+i)_n \geq 2W$, then it is determined what object m+1 drawn was a starting point of a line, or a point, then going to the step 7; if $D(m+i)_n < 2W$, connecting points of coordinates $(X(m+i)_{n-1}, Y(m+i)_{n-1})$, $Y(m+1)_n)$ with a line of width W(m+i), then going to the step 7;

7. Continuing to scan the RS232 port, then returning back to step 1.

1. The computer scans the RS232 port through the application program, and read coordinate values (X(m)n, Y(m)n), (X(m+1)n, Y(m+1)n), ... (X(m+i)n, Y(m+i)n), W(m), W(m+1), ... W(m+i) and scanning sequence numbers uploaded from the microprocessor, then save those data into the computer memory, and uses the W value to decide the type of objects, i.e, if W(m) or W(m+1) or W(m+i)≧2L (this condition can be adjusted based on user needs; it might be W>3L or another value), it is determined the object to be an eraser, and exits the multiple object capturing program, and move on to single object capturing program; if not it is determined the object to be multiple blocking objects, and going to the next step;

2. Substitute coordinate values $(X(m)_n, Y(m)_n)$, $(X(m+1)_n, Y(m+1)_n)$, ... $(X(m+i)_n, Y(m+i)_n)$ to the equation $$D(m+i) = \sqrt{(X(m+i) - X(m+(i-1)))^2 + (Y(m+i) - Y(m+(i-1)))^2},$$

and calculate distance between different objects within one cycle, to reach the value D(m+i); then judge if those coordinates are consequent, i.e., if D(m+i)<2W; if yes, it is determined the object as an eraser, and move to single object capturing program; if not, it is determined the object as multiple block objects, and move to next step;

3. The application program starts to judge if coordinates of the moving objects $(m)_{n-1}$, $(m+1)_{n-1}$, ... $(m+i)_{n-1}$ m were captured; if object m was, going to the step 4; if object m was not, draw a point of width W(m) at coordinate $(X(m)_n, Y(m)_n)$, then going to the step 7; if object m+1 was, going to the step 5; if object m+1 was not, draw a point of width W(m+1) at coordinate $(X(m+1)_n, Y(m+1)_n)$, then going to the step 7; if object m+i was, going to the step 6; if object m+i was not, draw a point of width W(m+i) at coordinate $(X(m+i)_n, Y(m+i)_n)$, then going to the step 7;

4. Substitute the coordinate $(X(m)_{n-1}, Y(m)_{n-1})$ of the object m captured during last scanning cycle and the current coordinate $(X(m)_n, Y(m)_n)$ into the formula $D(m)_n = \sqrt{(X(m)_n - X(m)_{n-1})^2 + (Y(m)_n - Y(m)_{n-1})^2}$ to calculate distance; if the result $D(m)_n \geq 2L$, then it is determined what object m drawn was a starting point of a line, or a point, then going to the step 7; $D(m)_n < 2L$, connect coordinate $X(m)_{n-1}, Y(m)_{n-1}$ and $X(m)_n, Y(m)_n$ with a line of width W(m), then going to the step 7;

5. Substitute coordinate $(X(m+1)_{n-1}, Y(m+1)_{n-1})$ of the object m+1 captured during the last scanning cycle and the current coordinate $(X(m)_n, Y(m)_n)$ into the formula $$D(m+1)_n = \sqrt{(X(m+1)_n - X(m+1)_{n-1})^2 + (Y(m+1)_n - Y(m+1)_{n-1})^2}$$

to calculate distance; if the result $D(m+1)_n \geq 2W$, then it is determined what object m+1 drawn was a starting point of a line, or a point, then going to the step 7; if $D(m+1)_n \geq 2W$, connect coordinate $(X(m+1)_n, Y(m+1)_{n-1})$ and $X(m+1)_n, Y(m+1)_n$ with a line of width W(m+1), then going to the step 7;

6. Substitute coordinate $(X(m+i)_{n-1}, Y(m+i)_{n-1})$ of the object m+1 captured during the last scanning cycle and the the current coordinate $(X(m+i)_n, Y(m+i)_n)$ into the formula $$D(m+i)_n = \sqrt{(X(m+i)_n - X(m+i)_{n-1})^2 + (Y(m+i)_n - Y(m+i)_{n-1})^2}$$

to calculate distance; if the result $D(m+i)_n \geq 2W$, then it is determined what object m+1 drawn was a starting point of a line, or a point, then going to the step 7; if $D(m+i)_n < 2W$, connecting coordinate $(X(m+i)_{n-1}, Y(m+i)_n), Y(m+1)_n)$ with a line of width W(m+i), then going to the step 7;

7. Continue to scan the RS232 port, the return back to step 1;

By repeating steps 1 to 5, points of coordinates $(X(m)_{n+i}, Y(m)_{n+i})$ and $(X(m)_{n+(i-1)}, Y(m)_{n+(i-1)})$, $(X(m+1)_{n+i}, Y(m+1)_{n+i})$ and $(X(m+1)_{n+(i-1)}, Y(m+1)_{n+(m-1)})$, ... $(X(m+i)_{n+i}, Y(m+i)_{n+i})$ and $(X(m+i)_{n+(i-1)}, Y(m+i)_{n+(i-1)})$ are connected continuously, thus the track of the moving object or handwriting can be re-constructed in real time on the white board on the computer screen, and the image can be stored or retrieved at any time based on users' needs.

Figure 10:
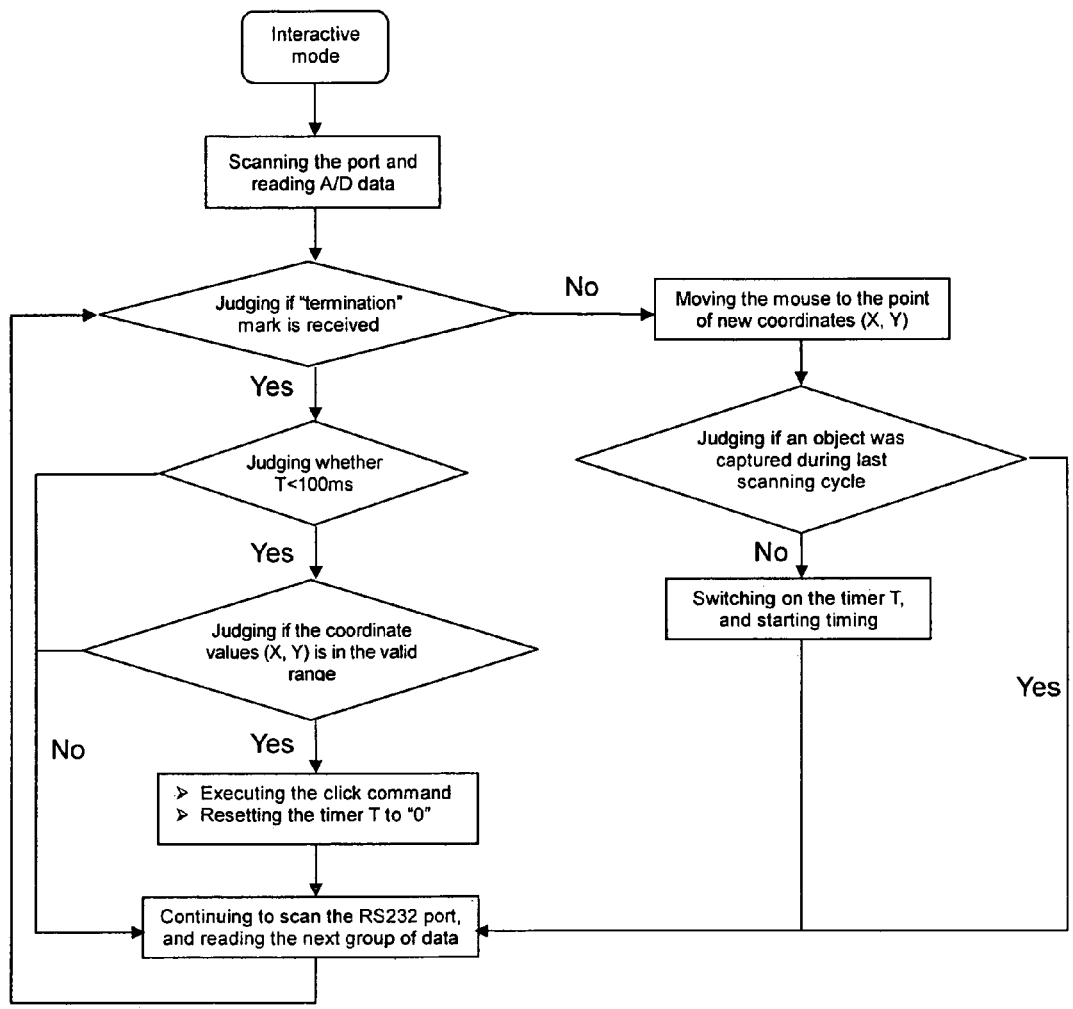
FIG. 10 is the flow chart of the interactive mode.

The main steps of this invention under computer interactive mode will be described in details according to the flow chart of one embodiment as shown in FIG. 10:

Assuming: n is the scanning cycle sequence number, i is a constant ranging from 1 to ∞, W is the diameter of the moving object, L is the physical dimension of a receiving diode.

1. The computer scans the RS232 port under the application program, and reads coordinate value (Xn, Yn) or the "termination" mark uploaded from the microprocessor;

2. Following step 1, if "termination" mark is received, going to the step 4; if coordinate value (Xn, Yn) and value W are received, moving the mouse to the screen position corresponding to (Xn, Yn), then going to the next step;

3. Judging if an object $(X_{n-1}, Y_{n-1})$ was captured during last scanning cycle; if yes, it is determined that the touching is going on, then going to the step 6; if not, it is determined that the touching has just started, then switching on the timer T, and starting the timer; going to the step 6;

4. The application program judges if T<100 ms on the timer; the threshold can be set and adjusted by users by means of application software; if not, it is determined as a void touching event, then going to the step 6; if yes, it is determined as an effective touch, and going to the next step;

5. Judging if the touching or clicking position (Xn, Yn) is in the valid range of the instruction; if yes, executing the click command in Microsoft Windows system or another application software instruction, and at the same time, resetting the timer T to "0", and going to the next step; if not, resetting the timer T to "0", and going to the next step;

6. Continuing scanning the RS232 port, and returning to step 1 to read captured coordinate values of the next cycle uploaded from the microprocessor.

With the computer application program, by repeating steps 1-6, the above interactive operation of this invention can be realized.

What is claimed is:

1. An interactive infrared electronic white board, wherein the infrared emitting array (611) horizontally and vertically lined up on the edge of the white board, and the corresponding infrared receiving array (621) horizontally and vertically lined up on the edge of the white board are connected with the microprocessor (637) via the row driver, the column driver respectively; the output port of the column driver (607) of the infrared emitting array (611) is connected with the high frequency modulated signal generator (640); the output port of the column driver (617) of the infrared receiving array (621) is connected with the microprocessor (637) via the signal receiving circuit, the analog-digital (A/D) converter (644), characterized in that: by means of a curve equation including a tan(x) function, or a quadratic curve equation, or a curve equation of higher orders, the relationship between the voltage generated by the infrared receiving diode and the blocked width di in the infrared light path blocked by the blocking object is established, and the equation for calculating the dimension W of the object is:

$$W = \sum_{i=j}^{N} d_i = d_j + d_{j+1} \ldots d_{j+n}, N = j + n$$

wherein, j is the sequence number of the receiving diode;
D is the blocked width in the light path;
n is a constant variable;
and the equation for calculating the coordinates of the moving object is:

$$X = j \times L - d_j + \left(\sum_{i=j}^{N} d_i\right) \div 2$$

$$Y = k \times L - d_k + \left(\sum_{i=k}^{N} d_i\right) \div 2$$

wherein j is the sequence number of the receiving diode on the X axis;
k is the sequence number of the receiving diode on the Y axis;
d is the blocked length in the light path;
N: N=j+n, n is a constant variable;
after the values of W, and X, Y are defined, coordinate capturing, identification, track reconstruction and storage of the moving path of the moving object on the infrared white board can be realized.

2. An interactive infrared electronic white board according to claim 1, characterized in that: inside the microprocessor or computer there is a standard data table based on experiments by listing the one to one relationship between the voltage generated by the infrared receiving diode and the blocked width di in the infrared light path blocked by the blocking object, when the object is moving inside the light path with different radius of emitting and receiving diodes; the microprocessor can look up the value of blocked width di in the infrared light path with the voltage value obtained from the infrared emitting diode, thus implements the coordinate capturing, identification, track reconstruction and storage of the moving object on the electronic white board, or interpolate the blocked width di in infrared light path obtained by the curve equation into the table, so as to get more precise values.

3. An interactive infrared electronic white board according to claim 1 or 2, characterized in that: the method of coordinate capturing, identification, track reconstruction and storage of moving objects is as follows:

assuming n is the scanning cycle sequence number; i is a constant ranging from 1 to ∞; W is the diameter of the moving object; L is the physical dimension of the infrared emitting and receiving diode; m is the object ID number; X(m) is the X coordinate of the object m; Y(m) is the Y coordinate of the object m; steps for coordinate capturing and storing of moving objects are:

1) the microprocessor writes the "row" and "column" address codes into "00H", and outputs it to the row and column driver address bus of the emitting and receiving diode array through address ports;

2) row and column drivers of the emitting array switch on the emitting diode located on the corresponding row and column, said diode then starts to emit infrared high frequency modulated pulses; at the same time, row and column drivers of the receiving array switch on the corresponding receiving diode, since each pair of emitting and receiving diode is located on the same optical axis, corresponding one to one, the receiving diode starts to output analogy pulse signals;

3) following step 2), a receiving conversion circuit converts the received analog pulse signal into analog voltage range signal, then inputs it to the analog-digital (A/D) converter, which in turn converts the analog voltage amplitude signal into discrete values;

4) following step 3), the microprocessor reads A/D voltage values from the A/D signal input port, and makes judgments: if the value is near the peak value of the A/D voltage curve, i.e., when A/D value is at full range, the judgment is that there is no blocking event, and going to the next step; otherwise, the judgment is that a blocking event happens, then the microprocessor runs the conversion sub-program concerning the A/D voltages and moving coordinates, so as to obtain the Xn or Yn coordinate values, and going to the next step;

5) following step 4, judging whether the microprocessor timer overflows, if yes, going to step 6; otherwise, back to step 2;

6) at this stage, a scanning cycle for a unit, i.e., scanning for a pair of emitting and receiving diodes, has accomplished; then the microprocessor judges if scanning of all row drive lines of all emitting and receiving arrays have been finished; if yes, going to step 8; otherwise going to the next step;

7) the microprocessor adds 01H to the row address code, and outputs it to the address bus of the row driver, then scanning of the next row of the emitting and receiving arrays starts; back to step 2;

8) judging whether scanning of all column drive lines of all emitting and receiving arrays is finished, if yes, going to step 10; otherwise going to the next step;

9) the microprocessor adds 01H to the column address code, resets the row address code to 00H, then outputs the column address code to the address bus of the column driver, and outputs the row address code to the address bus of the row address driver; the scanning of the next column of the emitting and receiving arrays begins, then back to step 2;

10) at this stage, a full scanning cycle, i.e., scanning of all emitting and receiving diodes, has finished; a check is then made on if there is an moving object captured; if not, going to step 12; if yes, going to the next step;

11) if a single object is captured, storing the coordinates (Xn, Yn) of the moving object and the W values into the MMC storage device connected with the microprocessor based on the sequence number n of the scanning cycle, and uploading the data to computer through RS 232 port; then going to step 14; if multiple objects are captured, storing coordinates (X(m)n, Y(m)n), (X(m+1)n, Y(m+1), ... , (X(m+i)n, Y(m+i)n) of the moving objects captured in this cycle and W(m), W(m+1), ... , W(m+i) values into the MMC storage device connected with the microprocessor based on the sequence number n of the scanning cycle, and uploading the data to computer through RS 232 port; then going to step 14;

12) judging if the interactive mode of the computer is on, if not, going to step 14; if yes, going to the next step;

13) judging if the coordinate (X(n−1), Y(n−1) was captured during last scanning cycle, if yes, uploading a "terminated" mark through the RS232 port to the computer to notify the application program that the moving object has left the capturing range; then going to the next step; if not, going to the next step;

14) the microprocessor resets the row address code to 00H, and the column address code to 00H, and outputs the column address code to the column driver address bus, the row address code to the row driver address bus; then returns to step 2 to continue next scanning cycle;

wherein the conversion sub program concerning A/D voltage and moving coordinates is:

assuming d is the width of the blocked portion in the light path blocked by the object, j is the sequence number of the receiving diode on X axis, k is the sequence number of the emitting diode on the Y axis;

1) after the microprocessor reads in the data from the A/D converter, it substitutes the data into a curve equation including a tan(x) function or a quadratic curve equation, or a curve equation of higher order to get the length or width di of the blocked portion in the light path of said receiving diode by the blocking object, i.e., the height of the bow shape of the blocked portion;

2) then comparing the value di to the data table of the output voltage variation curve of the receiving diode collected from experiments, interpolating, valuing, so as to get the final precise position di;

3) using the following equation, by the means of substituting the known numbers j, k, dimension L of the receiving diode, height di of the bow shape of the blocked portion in the light path, calculating for the coordinates, the final moving positions on X, Y axis of the object captured during scanning cycle n are:

$$X_n = j \times L - d_j + \left(\sum_{i=j}^{N} d_i\right) \div 2$$

$$Y_n = k \times L - d_k + \left(\sum_{i=k}^{N} d_i\right) \div 2$$

4) storing said coordinate values Xn or Yn of the moving objects into the registers of the microprocessor; if multiple users are using the white board, i.e., more than one coordinates exist on axis X or Y, then, saving multiple (X(m), X(m+1)n . . . . X(m+i)n or multiple (Y(m)n, Y(m+1)n, . . . Y(m+i)n) into the registers of the microprocessor;

5) returning to the main program;

wherein the method of identification, track reconstruction and storage of a single moving object is:

(1) the computer scans the RS232 port through the application program, and after reading coordinates (Xn, Yn) values and scanning cycle sequence numbers uploaded from the microprocessor, the application program starts to judge whether there are (X(n−1), Y(n−1)) coordinates captured during last scanning cycle; if not, going to step 3; if yes, going to the next step;

(2) substituting coordinates (X(n−1), Y(n−1)) captured during last scanning cycle and the current coordinates (Xn, Yn) into the equation to calculate the distance between coordinates and to reach value D, then comparing D to the standard value, which is adjusted based on users' needs, but should not be less than 2W; if D<2w, then, going to step 4; if D≧2W, going to the next step;

(3) judging whether this is a starting point of another line or a different point, then judging type of the object; assuming W≦2L, which can be adjusted based on users' needs, then, it is confirmed that the moving object is a pen, the application software starts to draw a black point of diameter W at the corresponding position of coordinates (Xn, Yn) on the screen;

if W>2L, it is confirmed the moving object is an eraser, then the application software draws a white point of diameter W at the corresponding position of coordinates (Xn, Yn), i.e., erasing the point; then going to step 5;

(4) going on to judge the type of the object, if W≦2L, which can be adjusted based on users' needs, it is confirmed that the object is a pen, and connecting points of coordinates (X(n−1), Y(n−1)) and (Xn, Yn) with a black line of diameter W, then going to the next step; if W>2L, it is confirmed that the moving object is an eraser, connecting points of coordinates (X(n−1), Y(n−1)) and (Xn, Yn) with a white line of diameter W, then going to the next step;

(5) continuing to scan the RS232 port, then returning to step 1.

4. An interactive infrared electronic white board according to claim 1 or 2, characterized in that: the method of capturing, identification and track reconstruction of multiple moving objects is as follows:

1) the computer scans the RS232 port through the application program, and after reading coordinate values (X(m)n, Y(m)n), (X(m+1)n, Y(m+1)n), ... (X(m+i)n, Y(m+i)n), W(m), W(m+1), ... W(m+i) and sequence numbers of scanning cycles uploaded from the microprocessor, then saves those data into the computer memory, and uses the W value to decide the type of objects, i.e, if W(m) or W(m+1) or W(m+i)≧2L, which can be adjusted based on users' needs, and might be W>3L or another value, if yes, it is determined that the object is an eraser, then exiting the multiple object capturing program, and going to the single object capturing program; otherwise, it is determined that the objects are multiple blocking objects, and going to the next step;

2) substituting coordinate values $(X(m)_n, Y(m)_n)$, $(X(m+1)_n, Y(m+1)_n)$, ... $(X(m+i)_n, Y(m+i)_n)$ into the equation $$D(m+i) = \sqrt{(X(m+i) - X(m+(i-1)))^2 + (Y(m+i) - Y(m+(i-1)))^2},$$

and calculating distance between different objects within one cycle, to reach the value D(m+i); then judging if those coordinates are continuous, i.e., if D(m+i)<2W; if yes, it is determined that the object is an eraser, and going to the single object capturing program; otherwise, it is determined that the objects are multiple block objects, and going to the next step;

3) the application program starts to judge if coordinates of the moving objects $(m)_{n-1}$, $(m+1)_{n-1}$, ... $(m+i)_{n-1}$m were captured during last scanning cycle; if object m was captured, going to the step 4; if object m was not captured, drawing a point of width W(m) at the position of coordinate $(X(m)_n, Y(m)_n)$, then going to the step 7; if object m+1 was captured, going to the step 5; if object m+1 was not captured, drawing a point of width W(m+1) at the position of coordinate $(X(m+1)_n, Y(m+1)_n)$, then going to step 7; if object m+i was captured, going to the step 6; if object m+i was not captured, drawing a point of width W(m+i) at the position of coordinate $(X(m+i)_n, Y(m+i)_n)$, then going to the step 7;

4) substituting the coordinate $(X(m)_{n-1}, Y(m)_{n-1})$ of the object m captured during last scanning cycle and the current coordinate $(X(m)_n, Y(m)_n)$ into the formula $D(m)_n = \sqrt{(X(m)_n - X(m)_{n-1})^2 + (Y(m)_n - Y(m)_{n-1})^2}$ to calculate distance; if the result $D(m)_n \geq 2L$, then it is determined what object m drawn was a starting point of a line, or a point then goung to the step 7; if $D(m)_n < 2L$, connecting the points of coordinates $(X(m)_{n-1}, Y(m)_{n-})$ and $X(m)_n, Y(m)_n)$ with a line of width W(m), then going to the step 7;

5) substitute coordinate $(X(m+1)_{n-1}, Y(m+1)_{n-1})$ of the object m+1 captured during the last scanning cycle and the current coordinate $(X(m)_n, Y(m)_n)$ into the formula $$D(m+1)_n = \sqrt{(X(m+1)_n - X(m+1)_{n-1})^2 + (Y(m+1)_n - Y(m+1)_{n-1})^2}$$

to calculate distance; if the result $D(m+1)_n \geq 2W$, then it is determined that what object m+1 drawn was a starting point of a line, or a point, then going to the step 7; if $D(m+1)_n \geq 2W$, connecting the points of coordinates $(X(m+1)_{n-1}, Y(m+1)_{n-1})$ and $X(m+1)_n, Y(m+1)_n)$ with a line of width W(m+1), then going to the step 7;

6) substituting coordinate $(X(m+i)_{n-1}, Y(m+i)_{n-1})$ of the object m+1 captured during the last scanning cycle and the current coordinate $(X(m+i)_n, Y(m+i)_n)$ into the formula $$D(m+i)_n = \sqrt{(X(m+i)_n - X(m+i)_{n-1})^2 + (Y(m+i)_n - Y(m+i)_{n-1})^2}$$

to calculate distance; if the result $D(m+i)_n \geq 2W$, then it is determined what object m+1 drawn was a starting point of a line, or a point, then going to the step 7; if $D(m+i)_n < 2W$, connecting points of coordinates $(X(m+i)_{n-1}, Y(m+i)_{n-1}), Y(m+1)_n)$ with a line of width W(m+i), then going to the step 7;

7) continuing to scan the RS232 port, then returning back to step 1.

5. An interactive infrared electronic white board according to claim 1 or 2, characterized in that: the application program for the mode under which the electronic white board is interactive with the computer is as follows:

1) the computer scans the RS232 port under the application program, and reads coordinate value (Xn, Yn) or the "termination" mark uploaded from the microprocessor;

2) following step 1, if "termination" mark is received, going to the step 4; if coordinate value (Xn, Yn) and value W are received, moving the mouse to the screen position corresponding to (Xn, Yn), then going to the next step;

3) judging if an object $(X_{n-1}, Y_{n-1})$ was captured during last scanning cycle; if yes, it is determined that the touching is going on, then going to the step 6; if not, it is determined that the touching has just started, then switching on the timer T, and starting the timer; going to the step 6;

4) the application program judges if T<100 ms on the timer; the threshold can be set and adjusted by users by means of application software; if not, it is determined as a void touching event, then going to the step 6; if yes, it is determined as an effective touch, and going to the next step;

5) judging if the touching or clicking position (Xn, Yn) is in the valid range of the instruction; if yes, executing the click command in Microsoft Windows system or another application software instruction, and at the same time, resetting the timer T to "0", and going to the next step; if not, resetting the timer T to "0", and going to the next step;

6) continuing scanning the RS232 port, and returning to step 1 to read captured coordinate values of the next cycle uploaded from the microprocessor.

\* \* \* \* \*